(12) United States Patent
Choi et al.

(10) Patent No.: US 6,800,585 B2
(45) Date of Patent: Oct. 5, 2004

(54) CATALYST FOR SELECTIVE CATALYTIC REDUCTION OF NITROGEN OXIDES AND A METHOD FOR PREPARING THE SAME

(75) Inventors: Kyung-Ii Choi, Taejon (KR); Sang-Ho Lee, Taejon (KR); Choul-Woo Shin, Taejon (KR); Jun-Seong Ahn, Taejon (KR); Bong-Jea Kim, Taejon (KR)

(73) Assignee: SK Corporation, Seoul (KR)

( * ) Notice: Subject to any disclaimer, the term of this patent is extended or adjusted under 35 U.S.C. 154(b) by 0 days.

(21) Appl. No.: 10/470,850

(22) PCT Filed: Feb. 13, 2001

(86) PCT No.: PCT/KR01/00208

§ 371 (c)(1),
(2), (4) Date: Jul. 31, 2003

(87) PCT Pub. No.: WO02/046251

PCT Pub. Date: Aug. 22, 2002

(65) Prior Publication Data

US 2004/0053771 A1 Mar. 18, 2004

(51) Int. Cl.$^7$ ............... B01J 27/051; B01J 27/047; B01J 38/72; B01J 38/60
(52) U.S. Cl. ............... 502/220; 502/21; 502/22; 502/27
(58) Field of Search ............... 502/21, 22, 27, 502/220

(56) References Cited

U.S. PATENT DOCUMENTS

| | | | |
|---|---|---|---|
| 4,048,112 A | 9/1977 | Matsushita et al. | |
| 4,071,601 A | 1/1978 | Shiraishi et al. | |
| 4,314,913 A | 2/1982 | Derrien et al. | |
| 4,929,586 A | 5/1990 | Hegedus et al. | |
| 5,037,792 A | 8/1991 | Luck | |
| 5,827,489 A | 10/1998 | Garcin et al. | |
| 6,602,818 B2 * | 8/2003 | Choi et al. | 502/220 |
| 6,673,740 B2 * | 1/2004 | Choi et al. | 502/309 |

FOREIGN PATENT DOCUMENTS

KR  10-1995-0072277  12/1995

OTHER PUBLICATIONS

International Search Report, Nov. 2001.

\* cited by examiner

Primary Examiner—Elizabeth D. Wood
(74) Attorney, Agent, or Firm—Alston & Bird LLP

(57) ABSTRACT

Disclosed are a catalyst for selective catalytic reduction of nitrogen oxides and a method for preparing the same. Useful for the removal of nitrogen oxides is a catalyst prepared using spent catalysts having been absorbed with vanadium, nickel and sulfur in the hydro-desulfurization line of an oil refinery in which a catalyst for the hydro-desulfurization contains molybdenum, iron, cobalt and silicon on the alumina support in accordance with the present invention. The present catalyst can remove nitrogen oxides at a level of 90% or higher, exhibiting a 10% or more increase in efficiency of the catalyst performance. Additionally, the catalyst can increase the efficiency of spent catalyst reclamation by 250%.

7 Claims, 1 Drawing Sheet

US 6,800,585 B2

CATALYST FOR SELECTIVE CATALYTIC REDUCTION OF NITROGEN OXIDES AND A METHOD FOR PREPARING THE SAME

TECHNICAL FIELD

The present invention relates, in general, to a catalyst for selective catalytic reduction of nitrogen oxides using spent catalyst and a method for preparing the same. More specifically, the present invention relates to a catalyst prepared by use of raw materials unsuitable for general catalysts for selective catalytic reduction of nitrogen oxides, for example spent catalyst mainly adsorbed with vanadium, nickel and sulfur in the hydro-desulfurization line of an oil refinery, in which a catalyst for the hydro-desulfurization contains molybdenum, iron, cobalt, silicon and so on, and a method for preparing the same.

PRIOR ART

Generally, exhaust gas discharged during combustion of hydrocarbon fuels such as hydrocarbon gas, gasoline or diesel fuel may cause serious pollutions of the environment. Various pollutants present in such exhaust gas are compounds containing hydrocarbon and oxygen, in particular, nitrogen oxides ($NO_x$) and carbon monoxide (CO). Therefore, extensive and intensive research has been carried out for years to decrease the amount of harmful gas exhausted from coal-steam power plants, incinerators or combustion systems in the automobile industry.

Techniques for effectively eliminating nitrogen oxides ($NO_x$) are commonly classified into a selective catalytic reduction (SCR) using a catalyst and a reductant together, a selective non-catalytic reduction (SNCR) using only a reductant without a catalyst, a low-$NO_x$ burner controlling a combustion state in the burner and so on.

Among the aforementioned techniques, the selective catalytic reduction is valued as the most effective technique for removing nitrogen oxides, taking account of the generation of secondary pollution, removal efficiency, operation cost, etc. In case of using the selective catalytic reduction technique, nitrogen oxides may be removed with an efficiency of 90% or greater and the endurance period of the catalyst is about 2 to 5 years. In addition, SCR technique is technically advantageous because poisonous dioxin may be removed, along with nitrogen oxides, in the incinerator.

Catalysts useful in the selective catalytic reduction are classified into an extrusion catalyst, a metal plate catalyst, and a pellet catalyst, depending on their external forms. Currently, the extrusion catalyst and the metal plate catalyst are widely used in steam plants and incinerators, and the pellet catalyst is suitable for the preparation processes of nitric acid, caprolactam, etc. The catalyst composition mainly comprises oxides of active metals such as vanadium, molybdenum, tungsten and the like, and further comprises other transition metal components for shifting active temperature ranges and enhancing durability of the catalyst.

Useful as a support in the selective catalytic reduction techniques is titania ($TiO_2$), alumina ($Al_2O_3$), silica ($SiO_2$) and so on, in which titania is more preferably used in terms of the poisoning resistance thereof.

In the selective catalytic reduction technique, a catalyst manufactured by impregnating said support with catalytic components may be coated on the structural bodies such as the metal plate or ceramic honeycomb to prepare a catalytic body, through which exhaust gas can be passed, whereby harmful gases such as nitrogen oxides are adsorbed and thus-reduced into harmless materials.

In this regard, U.S. Pat. No. 5,827,489 discloses a process for the preparation of a catalyst for selective catalytic reduction containing oxides of crystal phases by impregnating a support of inorganic oxides such as titania, alumina, silica and zirconia with catalytic components such as vanadium, molybdenum, nickel and tungsten, thereafter heat treating. This patent employs a support and catalytic components with a superior poisoning resistance versus sulfur oxides for the selective catalytic reduction and has advantages of freely controlling the amounts of active metals, a specific surface area and pore sizes of the catalyst to prepare the catalyst having optimal performance in which a suitable amount of sulfate is added. On the other hand, it suffers from high preparation cost because, each of single materials (or precursors) used as the support and the catalyst should be prepared by methods of catalyst production and mixing.

Meanwhile, Korean Patent Laid-Open No. 95-72277 refers to recycling of spent catalysts discharged from a hydro-desulfurization process of an oil refinery. A catalyst for selective catalytic reduction prepared by recycling such spent catalysts in the presence of ammonia as a reducing agent according to said invention is more advantageous in terms of low preparation cost, inherent poisoning resistance versus sulfur oxides, and containing the high content of metal components with excellent activities for nitrogen oxides reduction, compared with a catalyst prepared by a combination process of single materials.

However, the above-mentioned invention suffers from the disadvantage that the spent catalyst discharged from different discharge-lines after a desulfurization process has different properties, thereby lowering catalytic performance. In case of using spent catalyst for selective catalytic reduction, it may be recycled with only a 30% recovery rate on the basis of the whole discharged amounts of the spent catalyst, and thus intensive research for solving said problems has been carried out.

DISCLOSURE OF THE INVENTION

Leading to the present invention, the intensive and thorough research on spent catalyst discharged from a hydro-desulfurization process of an oil refinery, carried out by the present inventors aiming to avoid the problems encountered in the prior arts, resulted in the finding that unsuitable raw materials as a catalyst for selective catalytic reduction of nitrogen oxides may be recycled to prepare a catalyst for selective catalytic reduction of nitrogen oxides which has excellent removal efficiency of nitrogen oxides.

Therefore, it is an object of the present invention to provide a catalyst for selective catalytic reduction of nitrogen oxides by use of spent catalyst, which can increase an efficiency of spent catalyst reclamation and has excellent removal effect of nitrogen oxides.

It is another object of the present invention to provide a method for preparing a catalyst for selective catalytic reduction of nitrogen oxides using spent catalyst.

To achieve said objects of the present invention, there is provided a method for preparing a catalyst for selective catalytic reduction of nitrogen oxides from spent catalysts having been adsorbed with vanadium, nickel and sulfur in the hydro-desulfurization line of an oil refinery in which a catalyst for the hydro-desulfurization contains molybdenum, iron, cobalt and silicon on the alumina support, comprising the following steps of:

providing a first material comprising 10 wt % or more of vanadium, 5 wt % or more of nickel, 5 wt % or more of sulfur and 3 wt % or less of molybdenum and having a specific surface area of 60 m²/g or smaller and pore sizes of 250 Å or larger from said spent catalysts;

providing a second material comprising 3 wt % or less of vanadium, 4 wt % or less of nickel, 2 wt % or less of sulfur and 5 wt % or more of molybdenum and having a specific surface area of 130 m²/g or larger and pore sizes of 150 Å or smaller from said spent catalysts;

pretreating the first and second materials, separately, at 300 to 400° C.; pulverizing each of the pretreated materials to an average particle size of 100 to 200 mesh;

mixing the first material with acid and water, then with the second material; and drying the mixture at 100 to 120° C. and then calcining at 450 to 550° C.

BRIEF DESCRIPTION OF THE DRAWING

The above and other objects, features and other advantages of the present invention will be more clearly understood from the following detailed description taken in conjunction with the accompanying drawing, in which.

BEST MODES FOR CARRYING OUT THE INVENTION

Figure 1:
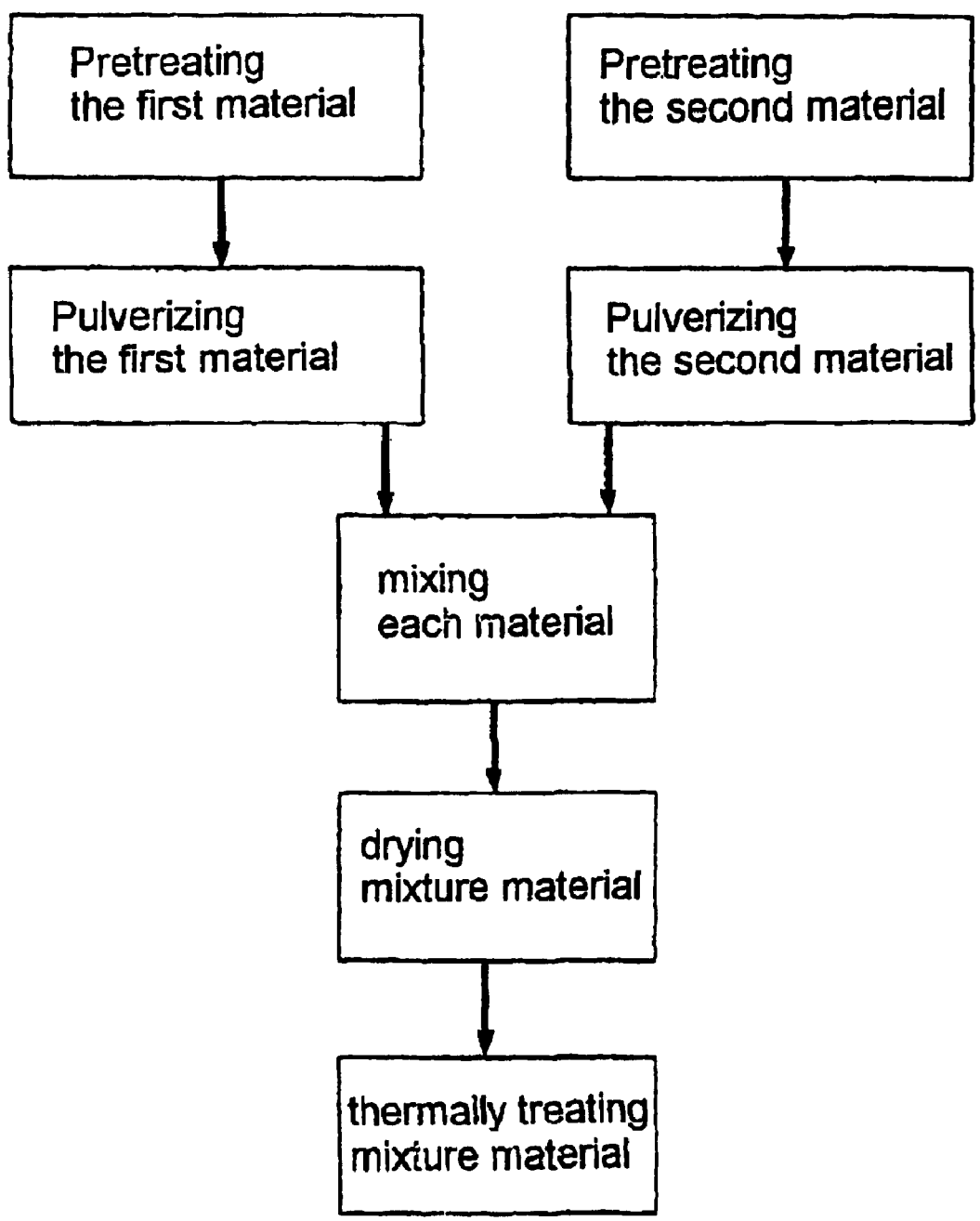
FIG. 1 shows a diagram of processes for preparing a catalyst for selective catalytic reduction of nitrogen oxides by providing the first material comprising high contents of vanadium, nickel, and sulfur and low content of molybdenum and having larger pore sizes and smaller specific surface area, and the second material comprising low contents of vanadium, nickel and sulfur and high contents of molybdenum and having smaller pore sizes and larger specific surface area, according to the present invention.

A catalyst for selective catalytic reduction of nitrogen oxides according to the present invention should have desired levels of active metal contents, a defined specific surface area and pore size of its support, and also exhibit removal efficiency of nitrogen oxides of 90% or more under severe test conditions to meet the standard requirement for commercialization.

Generally, a catalyst for selective catalytic reduction of nitrogen oxides has different performances, depending on a specific surface area and pore size according to pore properties of a support, and appropriate amounts of active metals, even though having the same support and catalytic components as spent catalyst when said catalyst for selective catalytic reduction is prepared using spent catalyst. Particularly, a catalyst having high amount of the active metals and a small specific surface area has excellent removal efficiency of nitrogen oxides but narrow active temperature ranges. On the other hand, in case of a catalyst having a small amount of active metals and large specific surface area, the removal efficiency of nitrogen oxides becomes low and the active temperature range thereof is shifted to high temperatures.

Commonly, a hydro-desulfurization process is divided into four steps, in which the first and the second steps are metal-removing and the third and the fourth steps are sulfur-removing. Therefore, a catalyst for removing metals has excess active metals in accordance with adsorption of the metals and thus smaller specific surface area. Whereas, a hydro-desulfurization of the third and the fourth steps which is a chemical reaction changes sulfur in raw materials into H₂S, and thus the catalyst for removing sulfur has a relatively low metal content because large amounts of metals are adsorbed in the first and the second steps.

When spent catalyst having said two properties is used in preparation of a catalyst for selective catalytic reduction in which ammonia is used as a reductant, the catalyst for removing metals has excess active metals and smaller specific surface area, thus having high removal efficiency of nitrogen oxides but narrow active temperature ranges. Another catalyst for removing sulfur with small amounts of active metals and larger specific surface area has low removal efficiency of nitrogen oxides and the active temperature ranges which is shifted to high temperature, and thus does not meet the standard requirement for a selective reducing catalyst of the present invention. About 70% or more of the whole amount of the spent catalyst discharged from a hydro-desulfurization line of an oil refinery has one of the two properties.

With reference to FIG. 1, there is shown a preparing process of a catalyst for selective catalytic reduction of nitrogen oxides according to the present invention. In the present invention, the catalyst for removing nitrogen oxides is prepared from the spent catalysts discharged from a hydro-desulfurization line of an oil refinery. The raw materials are classified into the first material which comprises an excess amount of vanadium, nickel and sulfur and a small amount of molybdenum, and has smaller specific surface area and larger pore size; and the second material which comprises a small amount of vanadium, nickel and sulfur and excess amount of molybdenum, and has larger specific surface area and smaller pore size. Each of these materials is pretreated and pulverized.

The first material comprises vanadium of 10 wt % or more, nickel of 5 wt % or more, sulfur of 5 wt % or more and molybdenum of 3 wt % or less and has properties such as a specific surface area of 60 m²/g or smaller and a pore size of 250 Å or larger, while the second material comprises vanadium of 3 wt % or less, nickel of 4 wt % or less, sulfur of 2 wt % or less and molybdenum of 5 wt % or more and has properties such as a specific surface area of 130 m²/g or larger and a pore size of 150 Å or smaller.

In FIG. 1, said first and second materials are pretreated by heat treating at 300 to 400° C. for 3 to 5 hours to eliminate oil, carbon and sulfur, impurities of spent catalyst. At this temperature for heat treatment, which is the standard processing condition, carbon and sulfur may be effectively eliminated.

Then, each of the heat-treated first and second materials is pulverized to an average particle size of 100 to 200 mesh. This pulverization step is conducted to make chemical dissolution of the active components in the first material easy during mixing the first material with the second material, and to migrate the second material with the active components dissolved from the first material. Accordingly, an average particle size in the above range is required.

The pulverized first material is mixed with acid and then added with the second material, in which the first material and the second material are mixed at a weight ratio of 4:6 to 2:8. If the mixed amount of the first material is less than 20 wt % on the basis of the whole mixture materials, active metals are deficient in the mixture materials and a specific surface area becomes excessively large. On the other hand, if the amount exceeds 40 wt %, active metals are excessively present in the mixture materials and a specific surface area becomes too low.

By adding acid and water to the preparative materials, excess active components contained in the first material are dissolved in acids and thus the dissolved active components are re-distributed into the second materials.

When active components are dissolved by an acid treatment, a specific surface area of an alumina support increases and thus excess active metals are adsorbed into pores of the second materials with large specific surface area.

The acid is added at one to two times as much as vanadium oxide ($V_2O_5$) in the first materials. The reason why the amount of acid is based on vanadium oxide content is that vanadium is the most preferable active metal in selective catalytic reduction of nitrogen oxides. The acid should dissolve active metals such as vanadium, nickel, molybdenum, and organic components. Examples of the acid useful in the present invention are oxalic acid, citric acid, diluted nitric acid, and the like. At that time, the acids are used at a suitable amount because excess addition of the acids results in dissolving the alumina support as well as metals.

The prepared mixture as above is dried at 100 to 120° C. for 23 to 25 hours and then heat treated at 450 to 550° C. for 3 to 5 hours so as to prepare a catalyst suitable for use in removing nitrogen oxides.

This drying step, through which moisture is removed and thus only active metals remain, is conducted to primarily impregnate the second, materials with the dissolved active metals in the first materials. The calcining step is carried out to crystallize said impregnated active metals to their oxide forms at a temperature of 450 to 550° C., at which crystallization of active metals and optimization of specific surface area of the alumina support is excellently accomplished.

As noted previously, the catalyst for selective catalytic reduction of nitrogen oxides comprises 3 to 10 wt % of vanadium, 3 to 10 wt % of nickel, 2 to 5 wt % of sulfur and 3 to 10 wt % of molybdenum, and has properties such as a specific surface area of 60 to 140 $m^2/g$ and pore sizes of 150 to 250 Å.

A catalytic body prepared by coating the catalyst to ceramic honeycomb or metal plate can remove nitrogen oxides at a level of 90% or higher, and also increase the efficiency of spent catalyst reclamation.

A better understanding of the present invention may be obtained in light of the following examples which are set forth to illustrate, but are not to be construed to limit the present invention.

EXAMPLES 1 AND 2

Each of the first and second materials having the compositions as shown in the following table 1, which were measured by XRF or ICP methods, was heat treated at 300° C. for 4 hours, and then pulverized to an average particle size of 200 mesh. The pulverized first materials were mixed with oxalic acid corresponding to twice the amount of vanadium in the first materials, and then with the second materials at a weight ratio of the first materials to the second materials of 3:7. Thereafter, this mixture was dried at 100° C. for 24 hours and then calcined at 500° C. for 5 hours to yield a catalyst, which was then molded into 20 to 40 mesh and measured for catalytic performance. The results are presented in Table 2, below.

The performance test of the catalyst was conducted in the presence of 500 ppm NO and 500 ppm $NH_3$, under severe conditions of a gaseous hourly space velocity of 100,000/hr, and reaction temperature was raised at a rate of 5° C./min. in the range of 30° C. to 500° C.

As can be seen in the following tables 1 and 2, the first material having small specific surface area and large pore sizes has nitrogen oxides reduction catalytic activity less than 80% and narrow active temperature ranges, whereas the second material having large specific surface area and small pore sizes has the activity less than 80% and active temperature shifted to high temperatures. It is found that the catalyst comprising the catalytic components as shown in the following table 2 satisfies selective catalytic reduction conditions suitable for removing nitrogen oxides, corresponding to 3 to 10 wt % of vanadium, 3 to 10 wt % of nickel, and 3 to 10 wt % of molybdenum and a specific surface area of 60 to 140 $m^2/g$ and pore sizes of 150 to 250 Å, thereby having a nitrogen reduction catalytic activity of 90% or higher.

TABLE 1

| | | | | | Catalyst Property | | Catalyst Performance | |
|---|---|---|---|---|---|---|---|---|
| | Components (wt %) | | | | Specific Surface Area | Pore Size | Maximum Activity | Activity Range |
| Example | V | Ni | Mo | S | ($m^2/g$) | (Å) | (%) | (° C.) |
| 1 1st material | 17.2 | 5.4 | 0.5 | 6.7 | 38.1 | 382.4 | 78.3 | 320–380 |
| 2nd material | 3.3 | 3.6 | 10.3 | 1.6 | 168.7 | 147.9 | 76.6 | 360–420 |
| 2 1st material | 17.4 | 5.6 | 1.7 | 5.4 | 53.9 | 192.4 | 76.1 | 320–380 |
| 2nd material | 3.5 | 3.6 | 6.8 | 2.0 | 157.8 | 135.3 | 75.6 | 360–420 |

TABLE 2

| | | | | | Catalyst Property | | Catalyst Performance | |
|---|---|---|---|---|---|---|---|---|
| | Components (wt %) | | | | Specific Surface Area | Pore Size | Maximum Activity | Activity Range |
| Example | V | Ni | Mo | S | ($m^2/g$) | (Å) | (%) | (° C.) |
| 1 | 8.7 | 3.1 | 4.1 | 1.5 | 134.7 | 183.3 | 94.1 | 280–400 |
| 2 | 8.0 | 3.0 | 5.3 | 2.7 | 130.4 | 161.3 | 93.7 | 280–400 |

Industrial Applicability

Therefore, useful in the removal of nitrogen oxides is a catalyst prepared using spent catalysts discharged from the hydro-desulfurization process in accordance with the present invention. The catalyst has a specific surface area of 60 to 140 $m^2/g$ and pore sizes of 150 to 250 Å, based on 3 to 10 wt % of vanadium, 3 to 10 wt % of nickel, and 3 to 10 wt % molybdenum, which is suitable for the selective catalytic reduction of nitrogen oxide. The present catalyst can remove nitrogen oxides at a level of 90% or higher, exhibiting a 10% or more increase in efficiency of the catalyst performance. Additionally, the catalyst can increase the efficiency of spent catalyst reclamation.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing a catalyst for selective catalytic reduction of nitrogen oxides from spent catalysts having been adsorbed with vanadium, nickel and sulfur in the hydro-desulfurization line of an oil refinery in which a catalyst for the hydro-desulfurization contains molybdenum, iron, cobalt and silicon on the alumina support, comprising the following steps of:

providing a first material comprising 10 wt % or more of vanadium, 5 wt % or more of nickel, 5 wt % or more of sulfur and 3 wt % or less of molybdenum, and having a specific surface area of 60 $m^2/g$ or smaller and pore sizes of 250 Å or larger from said spent catalysts;

providing a second material comprising 3 wt % or less of vanadium, 4 wt % or less of nickel, 2 wt % or less of sulfur and 5 wt % or more of molybdenum, and having a specific surface area of 130 $m^2/g$ or larger and pore sizes of 150 Å or smaller from said spent catalysts;

pretreating the first and second materials, separately, at 300 to 400° C.;

pulverizing each of the preheated materials to an average particle size of 100 to 200 mesh;

mixing the first material with acid and water, then with the second material; and drying the mixture at 100 to 120° C. and then calcining at 450 to 550° C.

2. The method as defined in claim 1, wherein the excess active metal components in the first material are dissolved by the acid and then re-distributed into the support of the second material.

3. The method as defined in claim 1, wherein the acid is added at one to two times as much as vanadium oxide in the first material and selected from the group consisting of oxalic acid, citric acid and diluted nitric acid.

4. The method as defined in claim 1, wherein the first material and the second material are mixed at a weight ratio of 4:6 to 2:8.

5. A catalyst for selective catalytic reduction of nitrogen oxides prepared according to claim 1 or 2.

6. The catalyst as defined in claim 5, wherein the catalyst comprises 3 to 10 wt % of vanadium, 3 to 10 wt % of nickel, 2 to 5 wt % of sulfur and 3 to 10 wt % of molybdenum, and has a specific surface area of 60 to 140 $m^2/g$ and a pore size of 150 to 250 Å.

7. The catalyst as defined in claim 5, wherein the catalyst is applied to a structural body in the form of honeycomb or metal plate.

* * * * *